W. T. BEST.
Churn.
No. 77,160.
Patented April 28, 1868.
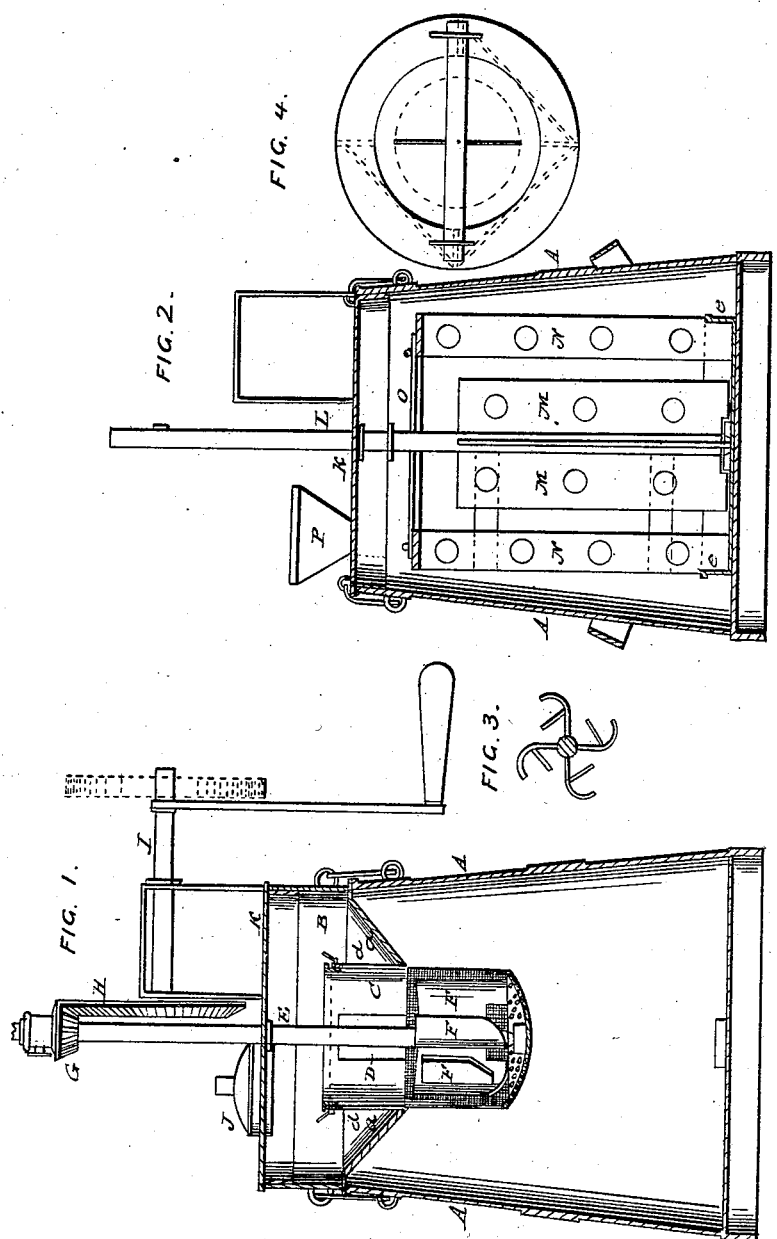

United States Patent Office.

WILLIAM T. BEST, OF SCRANTON, PENNSYLVANIA, ASSIGNOR TO HIMSELF AND DANIEL VAUGHAN, OF SAME PLACE.

Letters Patent No. 77,160, dated April 28, 1868.

IMPROVEMENT IN CHURNS.

The Schedule referred to in these Letters Patent and making part of the same.

TO ALL WHOM IT MAY CONCERN:

Be it known that I, WILLIAM T. BEST, of Scranton, in the county of Luzerne, and in the State of Pennsylvania, have invented certain new and useful Improvements in Churns; and do hereby declare that the following is a full, clear, and exact description thereof, reference being had to the accompanying drawings, and to the letters of reference marked thereon.

In the annexed drawings, making part of this specification, A represents a churn-body, which may be made of wood or metal, and in any of the well-known and usual ways. Over the mouth of this churn-body, and extending down into it, is a supplementary box, B, which I intend for the purpose of breaking the cream before it enters the churn proper. The box B is provided with an inclined or converging bottom, a a. Secured in this bottom a is a cylinder, C, about one-half of said cylinder running above and the other half below its point of contact with the bottom. This cylinder stands in a vertical position, and has its lower half and bottom perforated with many holes, or made of gauze wire. The upper end of the cylinder is open, and its sides above the bottom a are slotted to allow the cream to pass into it. An annular slotted band is passed around the cylinder, over that portion of it which is slotted, and this band is adjustable, acting as a gate to open or close the slots to regulate the amount of cream which passes in.

E represents a dasher-staff, which is provided upon its lower end with a series of breakers or wings, F F. This staff has one bearing in the bottom of the cylinder and one in the box-cover K. Upon the upper end of this staff is secured a bevel-wheel, G, which gears into a bevel-wheel, H, on a shaft, I. The shaft I lies in a horizontal position, and has its bearings in a suitable frame erected upon the churn-cover K, and is provided either with a crank-shaft or a pulley-wheel, by means of which it is revolved. The cover K is provided with a funnel, P, and a covered opening at J. The cream is poured in through the funnel, and its operation may be observed through the opening at J. The form of the breakers F is curved as represented in fig. 3.

In churning cream or milk with this churn, there are two operations. The first is breaking the cream with the device just described. The staff, with its breakers, being set in motion by means of the gear-wheels, the cream is poured into the box B through the funnel P, and, falling upon the bottom, a, is admitted in such quantities to the cylinder, by the gate surrounding said cylinder, as is desirable. The breakers F F revolving rapidly, cut and break the cream, and rupture many of its globules, and force it through the perforations in the lower part of the cylinder; thence it falls to the bottom of the churn proper.

As soon as the cream has all been run through the breaking-cylinder, the supplementary box B is removed, and a frame, N, is placed in the churn. This frame consists of two skeleton-heads connected by suitable perforated standards. The lower head is provided with a rim, e, around it, and also with a number of holes. It has a square hole in its bottom, which fits over a square plug or projection which is secured in the bottom of the churn, and is thus prevented from revolving or being displaced.

L represents the churn-staff, which is provided with dashers of any desirable construction, M M representing said dashers. A cross-piece, o, crosses the upper head of frame N, and has a hole in it, through which staff L passes. The cover K answers both as a cover for the box B, and also for the churn. The staff L runs up through cover K, and is provided upon its upper end with the bevel-wheel G. This bevel-wheel is made adjustable and so that it can be secured to the staffs by means of a thumb-screw. The staff L is revolved by the wheels G and H in a manner similar to that already described for staff E.

When the cream has been churned by the dashers M, and the butter has been well broken and is ready to be removed, I remove the cover K and lift out the staff M. I then lift the frame N, and, as its lower head forms a perforated pan or cup, the butter remains in it and is drawn from the churn, while the buttermilk runs through the perforations and returns to the churn. This mode of removing the butter is very simple, easy, and effective.

Of course, during the operation of churning, I can make observations through the opening at J, and can supply hot or cold water through the funnel P, as the nature of the case may require.

Having thus fully described my invention, what I claim as new, and desire to secure by Letters Patent, is—

1. The supplementary box B, having a converging bottom, and being provided with the slotted and perforated cylinder C, and used with the staff E and its breakers, as and for the purpose set forth.

2. The frame N, constructed substantially as described, and provided with a rim around its lower end for collecting the butter, said frame being used in the churn A and with the staff L and its dashers, as and for the purpose specified.

3. The gate $d$, surrounding the slotted portion of cylinder C, for regulating the flow of cream to said cylinder, substantially as herein specified.

In testimony that I claim the foregoing, I have hereunto set my hand, this 2d day of April, 1868.

WM. T. BEST.

Witnesses:
A. H. MARR,
DANIEL VAUGHAN.